United States Patent [19]

Oslapas

[11] Patent Number: 4,944,356
[45] Date of Patent: Jul. 31, 1990

[54] STEERING SYSTEM POSITION DETECTOR

[75] Inventor: Algis Oslapas, Dearborn Heights, Mich.

[73] Assignee: Ford Motor Company, Dearborn, Mich.

[21] Appl. No.: 291,087

[22] Filed: Dec. 28, 1988

[51] Int. Cl.$^5$ .............................................. B62D 5/04
[52] U.S. Cl. .................................... 180/79.1; 180/140; 280/91
[58] Field of Search ...................... 180/79.1, 141, 142, 180/143, 140, 148; 280/91

[56] References Cited

U.S. PATENT DOCUMENTS

| 4,621,833 | 11/1986 | Soltis | 280/771 |
| 4,671,523 | 6/1987 | Naumann | 280/91 |
| 4,785,901 | 11/1988 | Maeda | 180/142 |

FOREIGN PATENT DOCUMENTS

| 62-12457 | 1/1987 | Japan | 180/79.1 |
| 2198098 | 6/1988 | United Kingdom | 180/79.1 |

Primary Examiner—Mitchell J. Hill
Attorney, Agent, or Firm—Jerome R. Drouillard; Roger L. May

[57] ABSTRACT

A system for continuously detecting the operational position of an automotive steering gear includes a first sensor element incorporated into a sliding member which is reciprocably mounted within the steering gear, with the sliding member being linked with the output members of the steering gear, and a second sensor element for detecting the position of the first sensor element and the sliding member as the steering gear is moved reciprocably, with the second sensor element incorporated into a bearing for supporting the sliding member.

9 Claims, 3 Drawing Sheets

STEERING SYSTEM POSITION DETECTOR

BACKGROUND OF THE INVENTION

1. Field of the Invention

This invention relates to a system for continuously detecting the operational position of an automotive steering gear.

2. Disclosure Information

It is necessary with several types of automotive control systems to know the precise steering location of the road wheels, or in other words, the operational position of the steering gear. For example, systems which control adjustable shock absorbers according to the sensing of steering angles such as the systems illustrated in U.S. Pat. No. 4,621,833, rely upon the sensing of the steering position of the wheels. The U.S. Pat. No. '833 discloses a system for detecting rotational position of a steering driveshaft which is connected in turn to a steering gear. This system of the U.S. Pat. No. '833 is not, however, well suited for use with a remote mounted steering gear, unless such steering gear is driven by a mechanical driveshaft originating at the front steering gear Accordingly, it is an object of the present invention to provide a steering sensing system for detecting the operational position of an automotive steering gear which is suitable for use with a remotely mounted steering gear such as that employed with the rear wheels of four wheel steering systems U.S. Pat. No. 4,671,523 discloses an externally mounted sensor for detecting the position of the steered rear wheels of a vehicle having a four wheel steering system. Other systems employ additional sensors such as a linear variable differential transformer (LVDT) for the purPose of detecting the rear wheel steering position. Such sensors are subject to maladjustment and generally increase the space requirement for the electronic package mounted within the steering gear. It is a further object of the present invention to provide a steering gear position sensor which minimizes the additional space, weight and complexity requirements.

U.S. Pat. No. 4,785,901 discloses a rack end signal generating system in which only the extreme left and right steering positions of a steering rack are detected; such a system cannot provide information for controlling a steering gear throughout its full travel.

It is an advantage of the present invention that a sensor system according to this invention is compatible for use not only with remotely mounted rear wheel steering gears but also main steering gears employed at the front wheels of the vehicle.

It is an advantage of the system according to the present invention that the sensor system may be employed for continuously and reliably detecting the position of a steering gear as the steering gear moves the roadwheels from one extreme position to the other extreme of the possible steering positions.

Other objects, features and advantages of the present invention will become apparent to those skilled in the art upon reading this specification.

SUMMARY OF THE INVENTION

In accordance with this invention, a system for detecting the operational position of an automotive steering gear comprises a magnet attached to a component within the steering gear, with the component to which the magnet is attached and the magnet being subject to movement synchronously with the output members of the steering gear, and detection means for continuously detecting the position of the magnet and output members as the steering gear is moved reciprocally. The magnet may be attached to the rack of a rack and pinion steering gear. The detection means preferably comprises an inductive pickup positioned in proximity to the magnet. The inductive pickup may comprise a coil which encircles a portion of the steering rack and may be incorporated into a bearing for slidably supporting the steering rack. Alternatively, the magnet may be attached to the piston rod of a hydraulically powered steering gear. Thus, a system for continuously detecting the operational position of an automotive rack and pinion steering gear preferably comprises a magnet recessed into a rack element which is reciprocably mounted within the steering gear, with the rack being linked with the output members of the steering gear, and means for detecting the position of the magnet as the steering gear is moved reciprocably, with such means comprising an inductive pickup coil which is molded into a bearing for slidably supporting the steering rack.

DESCRIPTION OF THE PREFERRED EMBODIMENTS

Figure 1:
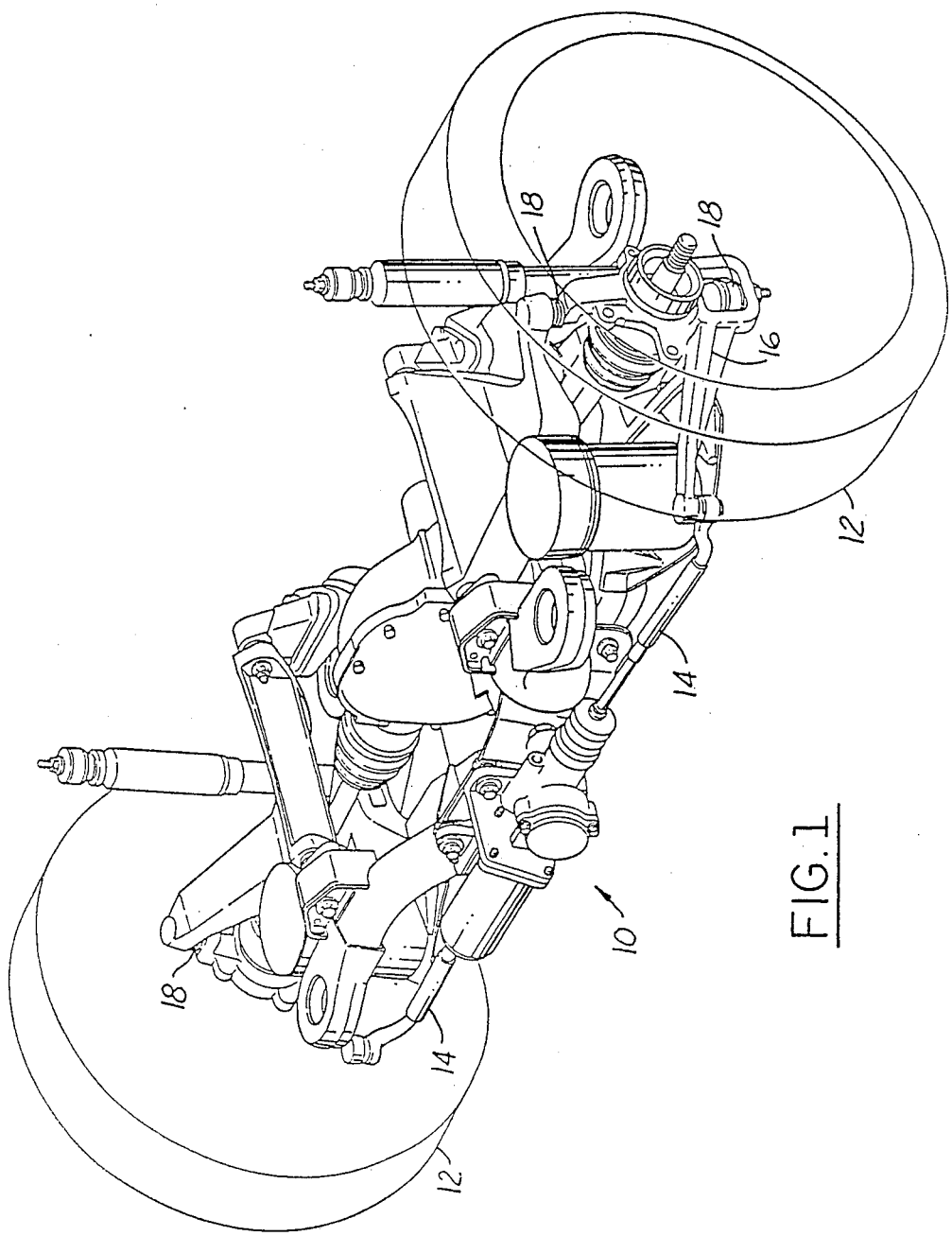
FIG. 1 is a perspective view of a rear axle incorporating a steering system with a sensor according to the present invention.

As shown in FIG. 1, rear steering gear 10 is coupled to a pair of spindles 16, by means of tierods 14. Accordingly, as the tierods are driven reciprocably by steering gear 10, road wheels 12 will be caused to rotate about the kinpin axes defined by ball joints 18, and as a result road wheels 12 will be steered by steering gear 10.

Figure 2:
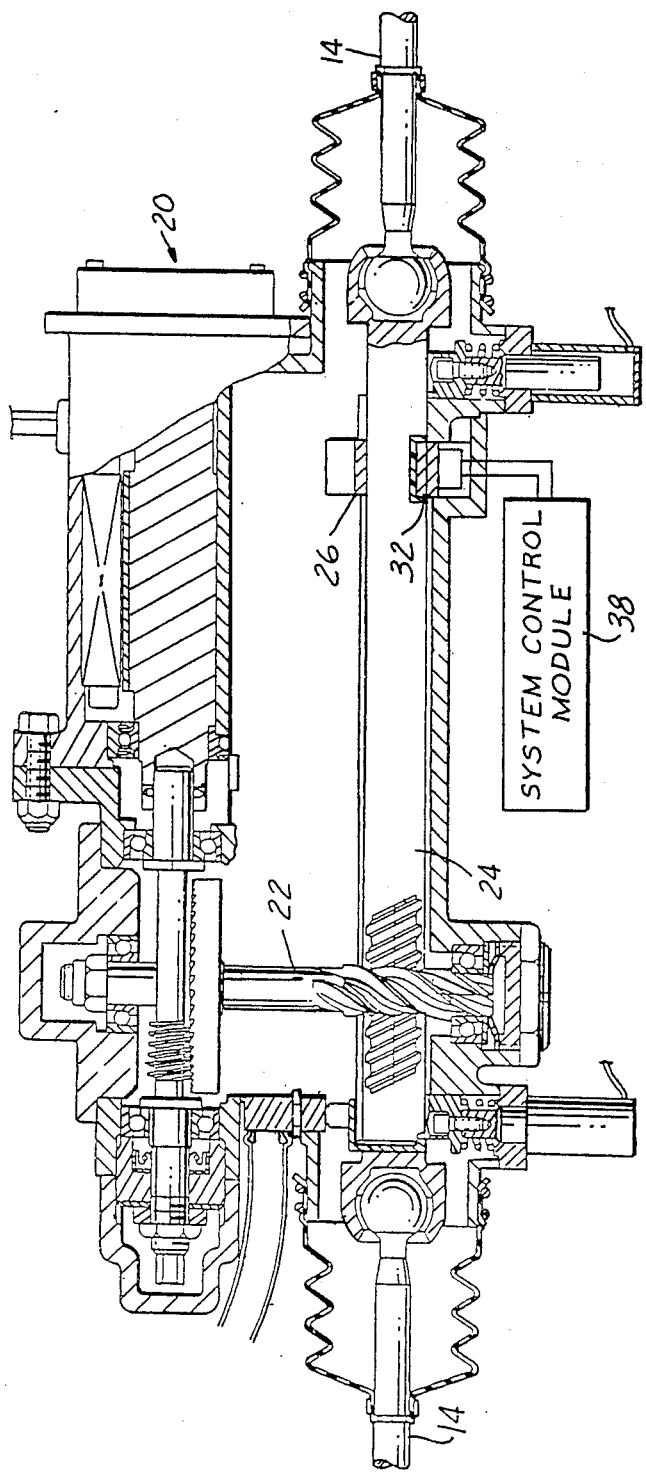
FIG. 2 is a partially broken away view of a steering gear having a sensor system according to the present invention.
Figure 2A:
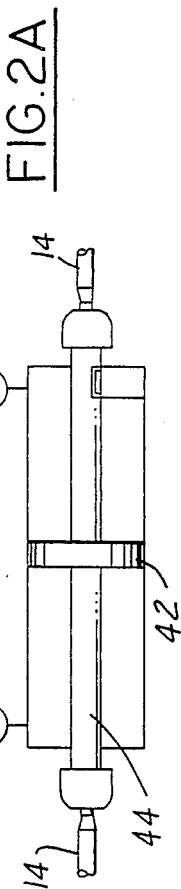
FIG. 2A is a schematic representation of a hydraulically powered steering gear including a sensing system according to the present invention.

FIG. 2 illustrates the internal parts of but one example of a steering gear suitable for use with a system according to the present invention. Those skilled in the art will appreciate that a system according to the present invention would be useful not only with the illustrated rack and pinion gear but also with other types of steering gears employing hydraulic, mechanical or electrical operating systems as prime movers. FIG. 2A illustrates a hydraulically powered steering gear in which piston 42, mounted upon piston rod 44, is moved reciprocably by means of hydraulic fluid directed by valves 46. The steering gear of FIG. 2A includes a support bearing and coil assembly and moving magnet, which will be fully explained in connection with FIG. 2.

The steering gear shown in FIG. 2 employs motor 20 as a prime mover to drive pinion shaft 22 through a series of gears. Pinion shaft 22 in turn drives rack 24 reciprocably. Note that tierods 14 are connected with the steering racks such that the reciprocal motion of rack 24 is transmitted to the tierods. Accordingly, the tierods comprise the output members of the steering gear. FIG. 2 further illustrates magnet 32, which is recessed into rack 24, and rack support bushing and coil assembly 26, which, taken together, comprise first and second sensor elements for detecting the position of rack 24.

Figure 3:
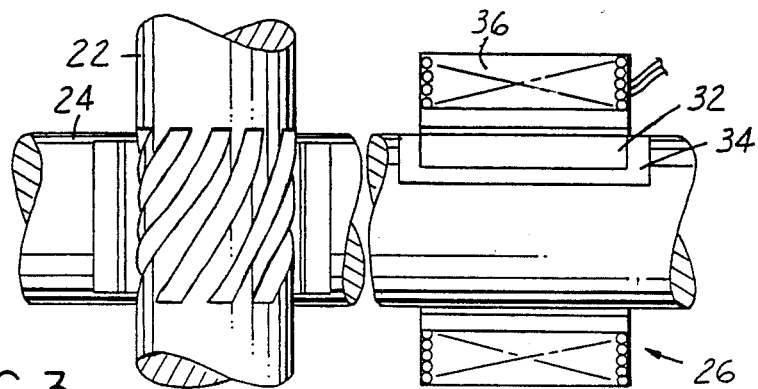
FIG. 3 is a plan view of a portion of the steering gear of FIG. 2 showing a sensor system according to the present invention.
Figure 4:
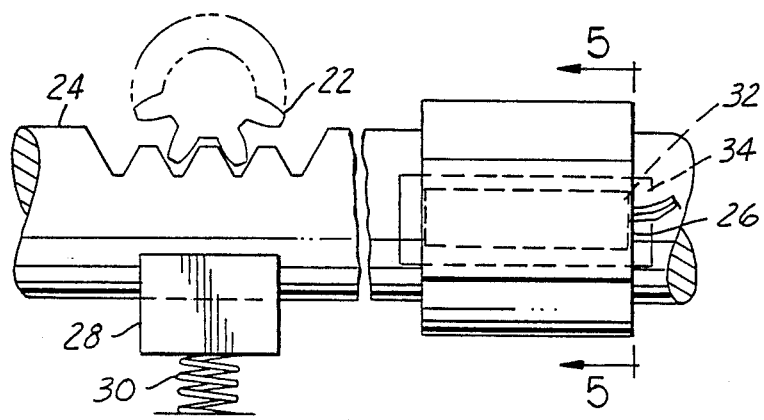
FIG. 4 is a rear elevation, partially broken away, of a portion of the steering gear FIG. 2 showing the sensor system of the present invention.
Figure 5:
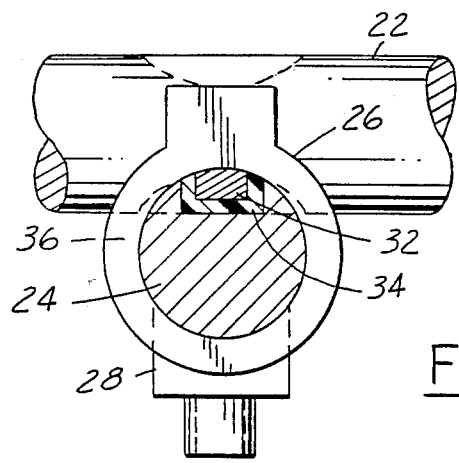
FIG. 5 is an end view taken along the line 5—5 of FIG. 3.

Details of the sensor assembly according to the present invention are shown in FIGS. 3, 4 and 5. As best shown in FIG. 4, rack 24 is supported on one end by means of rack support block 28 which is maintained in contact with the rack by means of compression spring 30. It is understood that the force imposed by compression spring 30 is opposed by a corresponding force exerted in a downward direction by pinion shaft 22. The opposite end of rack 24 is supported by means of rack support bushing and coil assembly 26. Assembly 26 comprises not only a bearing for supporting the rack but also a sensing coil for determining the position of magnet 32, and hence, the position of rack 24. Magnet 32 is recessed into magnet support 34 which, in turn, is recessed into rack 24. As a result, magnet 32 moves synchronously with rack 24. Magnet support 34 may comprise any suitable material such as aluminum or plastic or other materials known to those skilled in the art and suggested by this disclosure. As shown in the figures, assembly 26 includes winding 36, which is connected with system control module 38 to permit the control module to be advised at all times of the location of magnet 32 and rack 24. Winding 36 comprises an inductive pickup coil. The sensor may be operated by passing an appropriate electrical potential through winding 36 and by measuring the current within the winding. As magnet 32 moves into greater or lesser proximity of winding 36, the current within winding 36 will change accordingly. As a result, system control module 38 will be able to ascertain the position of rack 24 by means of a lookup table or other means incorporated into a microprocessor or other calibrated device contained within the system control module. It is important to note that a system according to the present invention may be employed for the purpose of continuously tracking the location of the steering rack as the rack moves from one extreme of its travel to the other such extreme. Also, as noted above, a system according to this invention will provide an accurate reading of rack position without the necessity of bulky external sensors.

It will be understood that the invention herein is not to be limited to the exact construction shown and described and that various changes and modifications may be made without departing from the spirit and scope of the invention as defined by the appended claims.

I claim:

1. A system for continuously detecting the operational position of an automotive steering gear, comprising:
    a magnet attached to a rack member which is reciprocably mounted within said steering gear, with said rack being linked with the output members of said steering gear; and means for continuously detecting the position of said magnet as said steering gear is moved reciprocably, with said means comprising an inductive pick up coil which is incorporated into a bearing for slidably supporting said steering rack.

2. A system according to claim 1, wherein said inductive pickup coil encircles a portion of said steering rack.
    means for continuously detecting the position of said magnet as said steering gear is moved reciprocably, with said means comprising an inductive pickup coil which is incorporated into a bearing for slidably supporting said steering rack.

3. A system according to claim 1, wherein said coil is molded into said bearing.

4. A system for continuously detecting the operational position of an automotive steering gear, comprising:
    a first sensor element incorporated into a sliding member which is reciprocably mounted within said steering gear, with said sliding member being linked with the output members of said steering gear; and
    a second sensor element for continuously detecting the position of said first sensor element and said sliding member as said steering gear is moved reciprocably, with said second sensor element incorporated into a bearing for supporting said sliding member.

5. A system according to claim 4, wherein said first sensor element comprises a magnet which is integral with said sliding member.

6. A system according to claim 5, wherein said magnet is attached to the piston rod of a hydraulically powered steering gear.

7. A system according to claim 5, wherein said magnet is recessed into the rack of a rack and pinion steering gear.

8. A system according to claim 4, wherein said second sensor element comprises an inductive pickupcoil which is integral with said bearing.

9. A system according to claim 4, wherein said steering geer comprises a rack and pinion steering gear.

* * * * *

UNITED STATES PATENT AND TRADEMARK OFFICE
CERTIFICATE OF CORRECTION

PATENT NO. : 4,944,356

DATED : July 31, 1990

INVENTOR(S) : Algis Oslapas

It is certified that error appears in the above-identified patent and that said Letters Patent is hereby corrected as shown below:

Column 4 in Claim 2, delete lines 3-7.

Signed and Sealed this

Twenty-fourth Day of September, 1991

Attest:

HARRY F. MANBECK, JR.

Attesting Officer

Commissioner of Patents and Trademarks